United States Patent [19]

Sakuma

[11] 3,865,532

[45] Feb. 11, 1975

[54] APPARATUS FOR EXPANDING THERMOPLASTIC FOOD IN A VACUUM

[75] Inventor: Sankichi Sakuma, Fujishiro, Japan

[73] Assignee: Takasago & Perfumery Co. Ltd., Tokyo, Japan

[22] Filed: Mar. 22, 1973

[21] Appl. No.: 344,047

Related U.S. Application Data

[63] Continuation of Ser. No. 125,492, March 18, 1971, abandoned.

[30] Foreign Application Priority Data

Mar. 31, 1970 Japan.................................. 45-30140

[52] U.S. Cl.... 425/405 R, 425/817 R, 425/DIG. 60
[51] Int. Cl.................................................. A23g 1/22
[58] Field of Search. 425/405 R, 4, 817 R, DIG. 60, 425/405, 404; 249/121, 141; 137/614.04

[56] References Cited
UNITED STATES PATENTS

| 1,944,989 | 1/1934 | Lux | 425/405 X |
|---|---|---|---|
| 2,636,539 | 4/1953 | Pajak | 425/405 X |
| 2,800,343 | 7/1957 | Ulrich | 137/614.04 |
| 2,926,934 | 3/1960 | Gill | 137/614.04 |
| 3,041,153 | 6/1962 | Elder et al. | 425/405 X |
| 3,526,688 | 9/1970 | Shelton et al. | 425/405 X |
| 3,532,064 | 10/1970 | Kreber | 425/407 X |

*Primary Examiner*—Francis S. Husar
*Assistant Examiner*—David S. Safran
*Attorney, Agent, or Firm*—Oblon, Fisher, Spivak, McClelland & Maier

[57] ABSTRACT

An apparatus for expanding thermoplastic food in a vacuum is disclosed. The apparatus includes a food mold, a cover for the food mold having a packing ring for providing an air tight seal with the mold, and a valve assembly mounted on the cover for selectively coupling a vacuum source to the mold.

1 Claim, 3 Drawing Figures

APPARATUS FOR EXPANDING THERMOPLASTIC FOOD IN A VACUUM

This is a continuation of application Ser. No. 125,492 filed Mar. 18, 1971, now abandoned.

BACKGROUND OF THE INVENTION

1. Field of the Invention

This invention relates to an apparatus for expanding thermoplastic food in a vacuum, and more particularly to an improved and simplified apparatus which is adapted to expand thermoplastic food by exposing the food to a vacuum.

2. Description of the Prior Art

It is generally well known to expand chocolate in a vacuum, and to use vacuum cooling apparatuses in manufacturing expanded chocolate. However, conventionally used equipment creates inefficient production due to its high cost, stationary configuration and complicated operation.

In addition, the conventionally used chocolate expanding apparatus has the following disadvantages: Chocolate is normally kept warm and fluid and must therefore be kept horizontal until it is expanded and then cooled to a solid mass state in a mold. However, as the body of the conventional vacuum cooling apparatus is circular in shape, it takes a considerable amount of time to sufficiently reduce the pressure therein. If the size of the vacuum cooling apparatus is, for example, 62 cm. in diameter and 71 cm. in width, having a chocolate mold which is 27.5 cm. × 20.5 cm. it may contain only 24 sheets of chocolate, and yet it takes 2 minutes, using a vacuum pump of 800 liters per minute discharge rate to reduce the pressure in the apparatus to from 2 to 10 mmHg.

At the same time, the chocolate is being cooled by means of the convention of a cooled atmosphere produced by cooling pipes in the vacuum chamber. Since it takes less time to cool the chocolate so as to solidify it than to completely evacuate the cooling apparatus, the chocolate is generally solidified as the pressure drops from 760 to 100 mmHg, with the result that it is not sufficiently expanded before it solidifies. Accordingly, in order to obtain uniform ideal expansion of chocolate in conventional devices, the cooling pipes must be reset to normal temperature when the chocolate solidifies so that the steps of expanding and cooling chocolate may be repeated, resulting in much time loss.

Since conventional vacuum cooling apparatuses are of the stationary type, chocolate must be manually put into and taken out of the apparatus.

In general, in order to ideally expand chocolate, the chocolate must be expanded within at least two minutes after it is put into a mold, because otherwise it becomes irregularly expanded, since chocolate will lose a portion of its heat as it is poured into a mold. Accordingly, it is necessary to provide a number of vacuum cooling apparatuses. However, since conventional vacuum cooling apparatuses are of the stationary type, as aforesaid, chocolate will lose its heat as it is being fed from the filling machine on a conveyor belt to a distant vacuum cooling apparatus. However, chocolate may be kept warm if it is fed to a cooling apparatus located near the filling machine. Thus, chocolate is differently expanded depending upon whether the cooling apparatus is close to or far from the filling machine, resulting in the production of irregular products.

If chocolate expanded in a vacuum is not cooled until it is sufficiently solidified in a vacuum, its foam or bubbly texture is broken when it is exposed to normal air pressure, and accordingly, the conventional expensive cooling tunnel becomes unnecessary.

This invention contemplates elimination of the aforesaid disadvantages of the conventional chocolate expanding apparatus, and provides a novel and improved apparatus for expanding thermoplastic food in a vacuum using in part conventional chocolate expanding facilities.

SUMMARY OF THE INVENTION

It is, therefore, an object of the present invention to provide an apparatus for expanding thermoplastic food in a vacuum which may automatically expand thermoplastic food with a one-touch connection to a vacuum source and which employs a simple and relatively inexpensive structure.

It is another object of the present invention to provide an apparatus for expanding thermoplastic food in a vacuum using a simple valve connection to a vacuum source.

Briefly, according to one aspect of the present invention, there is provided an apparatus for expanding thermoplastic food in a vacuum which comprises a food mold, a cover for said food mold with a packing or sealing ring for providing an air-tight seal between the mold and the cover, and valve means mounted on the cover for sealingly introducing a vacuum from a vacuum source to said mold.

According to another aspect of the present invention, there is provided an apparatus for expanding thermoplastic food in a vacuum which comprises a food mold, a cover for the food mold with a packing or sealing ring for providing an air-tight seal between the mold and the cover, a first valve means connected at one end to a vacuum source, and a second valve means sealingly mounted on the cover and connected at one end to a port of the first valve means and to the atmosphere and to the interior of said mold at its other end.

BRIEF DESCRIPTION OF THE DRAWINGS

Other features and advantages of the present invention will become apparent from the following description taken in conjunction with the accompanying Drawings, in which.

DESCRIPTION OF THE PREFERRED EMBODIMENT

Figure 1:
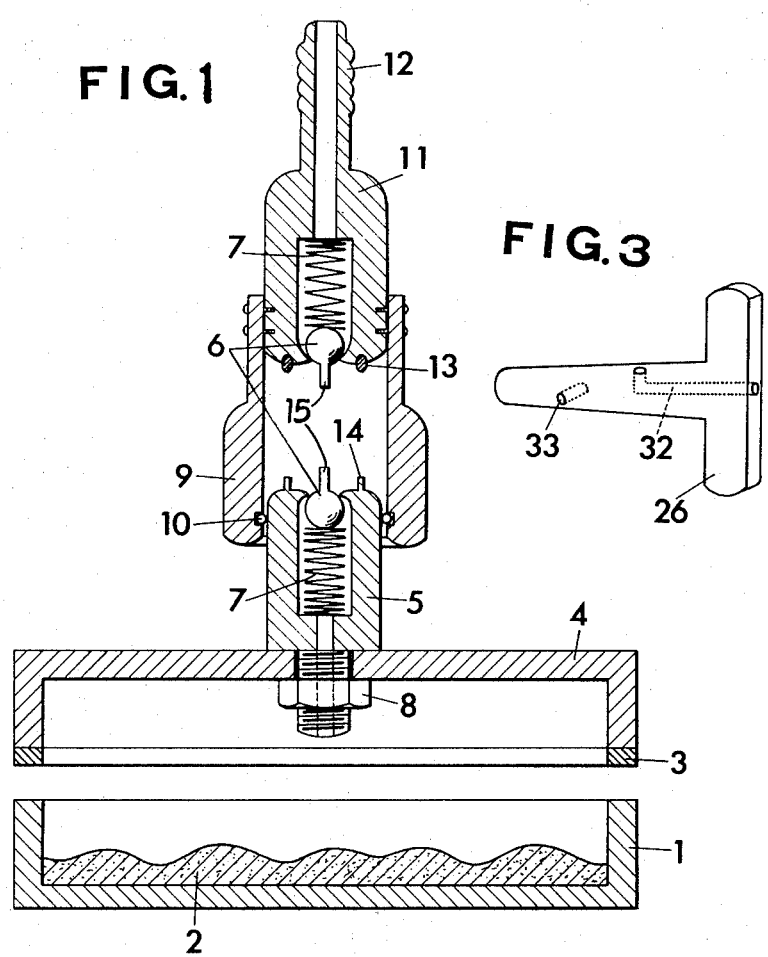
FIG. 1 is a sectional view of one embodiment of an apparatus for expanding thermoplastic food constructed according to the present invention.

Reference is now made to the Drawings, and particularly to FIG. 1, which shows one embodiment of the apparatus of this invention.

The apparatus comprises a thermoplastic food mold 1 containing a thermoplastic food 2 such as, for example, chocolate or candy, a cover 4 for the food mold formed to cover the opening of the mold 1 and having a packing or sealing ring 3 for providing an air-tight seal between the food mold 1 and the cover 4. The cover 4 may be made of metal or synthetic resin, and includes a valve means operated by a "one-touch" action connected to a vacuum pump (not shown). This valve means consists, for example, of a hollow cylindrical coupling 5 sealingly mounted at one end to the cover 4 by a fitting 8 which may include a nut and bolt. The valve means also includes a spherical valve 6 and a spring 7 so disposed in the hollow cylinder 5 as to close the passage therein by urging the spherical valve 6 into the opening formed at the upper end of the hollow cylinder 5. The spherical valve 6 includes a projection 15 which protrudes through the opening formed at the end of the cylinder 5, and the spherical valve may be opened by depressing the projection 15 formed on the spherical valve so as to open a passage through the hollow cylinder 5 into the interior of the mold 1. A connecting guide ring 9 sealingly engages the upper end of hollow cylinder 5 through a bearing or sealing ring 10. Another hollow coupling cylinder 11 sealingly engages the upper end of the guide ring 9. The upper end of hollow cylinder 11 includes a coupling 12 formed thereat for engaging a rubber hose to sealingly couple the entire device to a vacuum pump (not shown). Hollow cylinder 11 also includes a spherical valve 6 and a spring 7 so disposed in the hollow cylinder 11 as to close the passage at the lower end thereof by urging the spherical valve 6 toward the lower end of the cylinder 11. The spherical valve 6 is opened by depressing the projection 15 formed on the valve so as to open a passage through the hollow cylinder 11 to the vacuum source. An annular packing or sealing ring is mounted to the lower end of hollow cylinder 11, and corresponds to an annular projection 14 formed at the upper end of hollow cylinder 5 for sealingly engaging the projection 14 when the two are in contact.

In operation of the apparatus thus constructed, the thermoplastic food 2 is first put into the mold 1, and the mold 1 is covered with the cover 4. Then, the vacuum pump (not shown) is connected to the coupling 12 of the coupling hollow cylinder 11, and the connecting guide ring 9 is depressed, whereupon the projections on the spherical valves 6 abut one another so as to open the valves. The projection 14 of hollow cylinder 5 then sealingly engages a packing ring 13 on hollow cylinder 11 to form an air-tight seal so that the vacuum pump is directly coupled to the mold 1 to reduce the pressure in the mold.

When the thermoplastic food 2 in the mold 1 is properly expanded by the vacuum introduced into the mold, the connecting guide ring 9 is pulled upwardly so as to separate it from the hollow cylinder 5. Then the mold 1, integral with the cover 4, is fed to a cooling tunnel (not shown) so as to cool the thermoplastic food in the mold 1. Later, the projection 15 on the spherical valve 6 of the coupling hollow cylinder 5 is depressed so as to introduce atmospheric pressure into the mold 1, to permit removal of the cover 4 from the mold 1 so as to permit removal of the expanded thermoplastic food 2 therefrom. Thus, one cycle of operation is finished.

The following is an actual example of the use of the instant invention:

EXAMPLE

Expansion of Candy:

| MIXTURE (I) | | MIXTURE (II) | |
|---|---|---|---|
| Sugar | 400 g | Sugar | 400 g. |
| Honey | 200 g | Water | 150 g. |
| Water | 150 g | Potassium bitartarate | 0.08 g. |

EXAMPLE-Continued

Expansion of Candy:

| MIXTURE (I) | | MIXTURE (II) | |
|---|---|---|---|
| Coloring matter | proper amount | | proper amount |
| Flavor | proper amount | | proper amount |

The above mixtures excluding the coloring matter and flavor were heated to 150°C. When they reached a predetermined temperature, they were taken out on a cooling plate and the coloring matter and flavor were added. Then, the candy was sufficiently pulled by a pulling machine so that air was homogeneously mixed into it. Then, the candy was at once formed with a drop rool mill or staming machine, and then was put into the mold 1 of this invention. The mold was then evacuated with the result that the volume of the candy was expanded 4 or 5 times its original volume.

Figure 2:
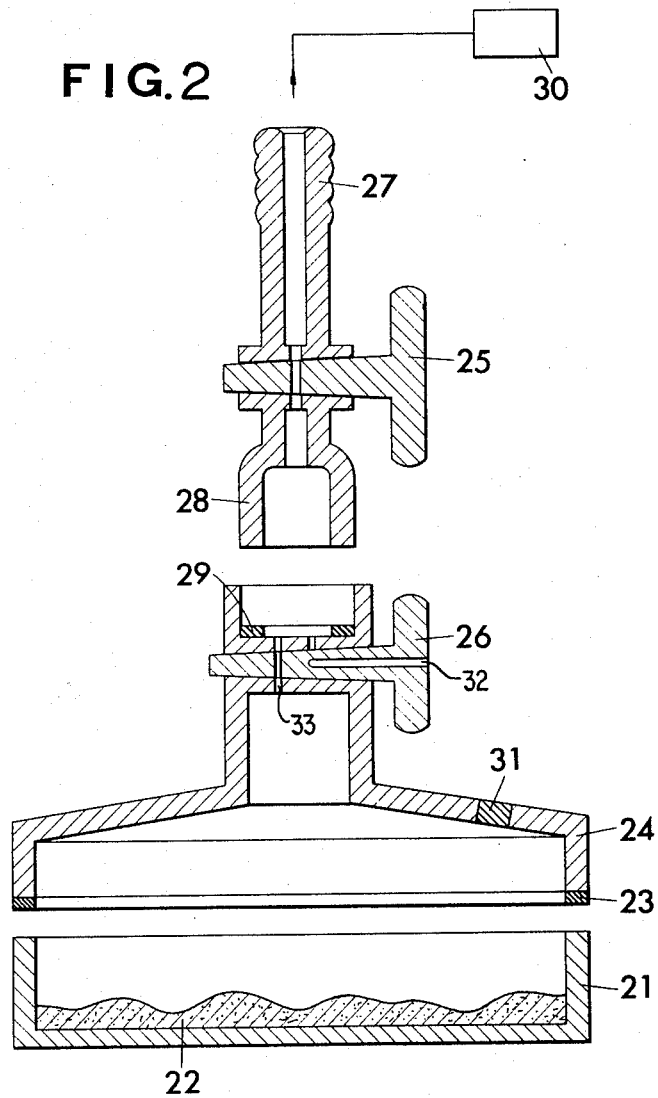
FIG. 2 is a sectional view of another embodiment of the apparatus of this invention; and, FIG. 3 is a perspective view of a cock valve used in the embodiment shown in FIG. 2.

Attention is now directed to FIGS. 2 and 3, which show another embodiment of the apparatus of this invention. This apparatus comprises a thermoplastic food mold 21 having a thermoplastic food 22 therein, such as, for example, chocolate or candy. A cover 24 is provided for covering the opening of the food mold 21, and includes a packing or sealing ring 23 for providing an air-tight seal between the food mold 21 and the cover 24. The cover 24 may be made of metal or synthetic resin. A first valve means 25, which may be a cock valve, for example, is provided, having an upper port 27, which is connected to a vacuum pump 30, and a lower port 28, which is adapted to form an air-tight seal with a sealing ring 29 provided in the upper portion of cover 24. A second valve means 26, which may also be a cock valve, is sealingly mounted into cover 24 and is connected at its upper port to lower port 28 of first cock valve 25, and to the atmosphere through a passage 32. The second cock valve 26 is connected at its lower port to the interior of the mold 21 through a passage 33.

A viewing window 31 is provided in cover 24.

In operation of the device described above, thermoplastic food 22 is first put into the mold 21, and the mold 21 is then covered with the cover 24. Then, the vacuum pump 30 is connected to the upper port 27 of cock valve 25, and the cock valve 25 is engaged with the cock valve 26. Then, the cock valve 25 is opened so as to open a passage from the vacuum pump 30 to the cock valve 26. The cock valve 26 is then opened to permit the interior of the mold 21 to be evacuated and to close the atmosphere passage 32. Thus, the mold 21 is evacuated due to the sealing action of the packing or sealing rings 23 and 29, with the result that the thermoplastic food 22 is expanded. This operation may also be accomplished by first opening the cock valve 25 so as to introduce a vacuum into the lower port 28 of the cock valve 25, and then opening the cock valve 26 so as to introduce further the vacuum into the interior of the mold 21. The expanded thermoplastic food 22 may be checked through the viewing window 31. When the thermoplastic food 22 in the mold 21 is expanded properly by the vacuum introduced into the mold 21, the cock valve 26 is turned 90° so as to close it in order to maintain the vacuum in mold 21 and to hold the expansion of the thermoplastic food 22 so that the thermoplastic food 22 will not be expanded further and will not contract.

Using the apparatus of the instant invention, it is necessary only to reduce the pressure in mold 21 which has the same area as cover 24. It takes only 15 seconds using a vacuum pump of 800 liters per minute capacity to reduce the pressure in the mold to the range of from 10 to 20 mmHg. assuming that the size of the mold 24 is 27.5 cm. × 20.5 cm., as aforesaid. Then, if the cock valve 26 is turned 90°, the atmospheric air is introduced into the connecting portion of the cock valves 25 and 26 so as to permit them to be readily disconnected. Then, the mold 21 integral with the cover 24 is fed to the cooling tunnel (not shown) so as to cool the thermoplastic food in the mold 21. The cooled thermoplastic food 22 after it is taken out of the cooling tunnel, may be removed from mold 21 by turning the cock valve 26 90° further so as to introduce atmospheric air into the mold 21, to permit ready removal of cover 24.

Since cock valve 25 remains connected to the vacuum pump 30, which still maintains a vacuum due to the closure of the cock valve 25, cock valve 25 may at once be engaged with the cock valve 26 of another mold 21 so as to repeat the above operation.

It should be understood from the foregoing description that since the thermoplastic food is subjected to a vacuum a very short time after it is put into the mold, the thermoplastic food may be uniformly expanded.

It should also be understood that since the present apparatus may use a conventional cooling tunnel, the cooling time is very short because the cooling air is blown directly on the mold, which is different from the conventional approach of indirectly cooling which is necessary when conventional molds are used.

It should also be understood that since the expanded thermoplastic food is automatically carried through the cooling tunnel, it is simply operated without manual labor.

It should also be understood that with the present invention, one third the number of molds with a single vacuum pump may expand the same capacity of food as the conventional apparatus with one-tenth of the expense.

It should also be understood that since the vacuum pump is connected to the mold with a one-touch operation, the process may be automated for mass production.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent is:

1. Apparatus for expanding thermoplastic food in a vacuum comprising:

a thermoplastic food mold, a cover therefor, said cover having a first sealing ring at the periphery thereof, a first hollow cylindrical cylinder which passes through said cover and communicates with said thermoplastic food mold, said first hollow cylindrical cylinder having a first cavity, a first spring and a first sphere disposed within said first cavity so as to bias said first sphere to close a first opening in said first cavity, said first sphere having a first projection thereon which extends beyond said first cavity when said first sphere is biased to close said first opening, a second hollow cylindrical cylinder which is adapted for connection to a vacuum source, said second hollow cylindrical cylinder having a second cavity, a second spring and a second sphere disposed within said second cavity so as to bias said second sphere to close a second opening in said second cavity, said second sphere having a second projection thereon which extends beyond said second cavity when said second sphere is biased to close said second opening, a guide ring, means rigidly connecting said guide ring to said second hollow cylindrical cylinder, a second sealing ring for slidably connecting said guide ring to said first hollow cylindrical cylinder, whereby movement of said guide ring with respect to said first hollow cylindrical cylinder causes said first projection of said first sphere to push against said second projection of said second sphere causing compression of said first and second springs and opening of said first and second cavities to permit the connection of a vacuum source to said thermoplastic food mold.

* * * * *